(12) United States Patent
Anderson et al.

(10) Patent No.: US 11,040,546 B2
(45) Date of Patent: Jun. 22, 2021

(54) FLUID LEVEL SENSING INDEPENDENT OF WRITE COMMAND

(71) Applicant: HEWLETT-PACKARD DEVELOPMENT COMPANY, L.P., Houston, TX (US)

(72) Inventors: Daryl E. Anderson, Corvallis, OR (US); James Michael Gardner, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 254 days.

(21) Appl. No.: 16/094,601

(22) PCT Filed: Jul. 14, 2016

(86) PCT No.: PCT/US2016/042324
§ 371 (c)(1),
(2) Date: Oct. 18, 2018

(87) PCT Pub. No.: WO2018/013125
PCT Pub. Date: Jan. 18, 2018

(65) Prior Publication Data
US 2020/0324554 A1  Oct. 15, 2020

(51) Int. Cl.
*B41J 2/175* (2006.01)
*G01F 23/00* (2006.01)
(Continued)

(52) U.S. Cl.
CPC ...... *B41J 2/17566* (2013.01); *G01F 23/0061* (2013.01); *G01F 23/241* (2013.01); *G01F 23/2921* (2013.01)

(58) Field of Classification Search
CPC .............................. B41J 2/175; B41J 2/17566
See application file for complete search history.

(56) References Cited

U.S. PATENT DOCUMENTS 5,617,121 A * 4/1997 Tachihara ............ B41J 2/17566
347/7
5,860,363 A   1/1999 Childers et al.
(Continued)

FOREIGN PATENT DOCUMENTS

EP      0881079 A2    12/1998
JP    H02165954 A     6/1990
(Continued)

OTHER PUBLICATIONS

US Automation Inc.; "Automatic Ink Leveler System"; Date Unknown—retrieved from the internet Oct. 18, 2018; http://www.usautocorp.com/images/inkmax_brochure.pdf.

*Primary Examiner* — Scott A Richmond
(74) *Attorney, Agent, or Firm* — Fabian VanCott

(57) ABSTRACT

In one example a fluid level sensing device is described. The device includes a sensing die having a number of fluid level sensors disposed thereon and a number of control devices, each control device corresponding to one of the number of fluid level sensors. A control device includes a comparing device to determine a state of a corresponding fluid level sensor. A state of the fluid level sensor is selected from the group consisting of a fluid state and a no-fluid state. Each control device also includes a non-volatile memory device corresponding to the comparing device to indicate whether the corresponding fluid level sensor is at the fluid state or the no-fluid state. A control device also includes a locking device to irreversibly set the non-volatile memory device to the no-fluid state independent of a write command from a controller.

20 Claims, 7 Drawing Sheets

(51) Int. Cl.
*G01F 23/24* (2006.01)
*G01F 23/292* (2006.01)

(56) References Cited

U.S. PATENT DOCUMENTS

| | | |
|---|---|---|
| 6,247,775 B1 | 6/2001 | Walker |
| 6,585,359 B1 | 7/2003 | Gasvoda et al. |
| 7,059,696 B2 * | 6/2006 | Eguchi ................. B41J 2/17566 347/19 |
| 8,215,734 B2 | 7/2012 | Asauchi |
| 2004/0212643 A1 | 10/2004 | King et al. |
| 2005/0259123 A1 | 11/2005 | Rice et al. |
| 2015/0273848 A1 * | 10/2015 | Ge ......................... B41J 2/1404 347/7 |

FOREIGN PATENT DOCUMENTS

| | | |
|---|---|---|
| WO | WO-2010077387 A1 | 7/2010 |
| WO | WO-2014084843 A1 | 6/2014 |
| WO | WO-2015119594 A1 | 8/2015 |

\* cited by examiner

FLUID LEVEL SENSING INDEPENDENT OF WRITE COMMAND

BACKGROUND

Fluid reservoirs are used to contain various types of fluids. For example in printing systems, print cartridges hold stores of printing fluid such as ink. The ink, or other printing fluid from a reservoir, is supplied to a printhead which deposits the printing fluid onto a medium, such as paper. As the printing fluid is deposited onto the medium, the printing fluid is depleted from the fluid reservoir.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
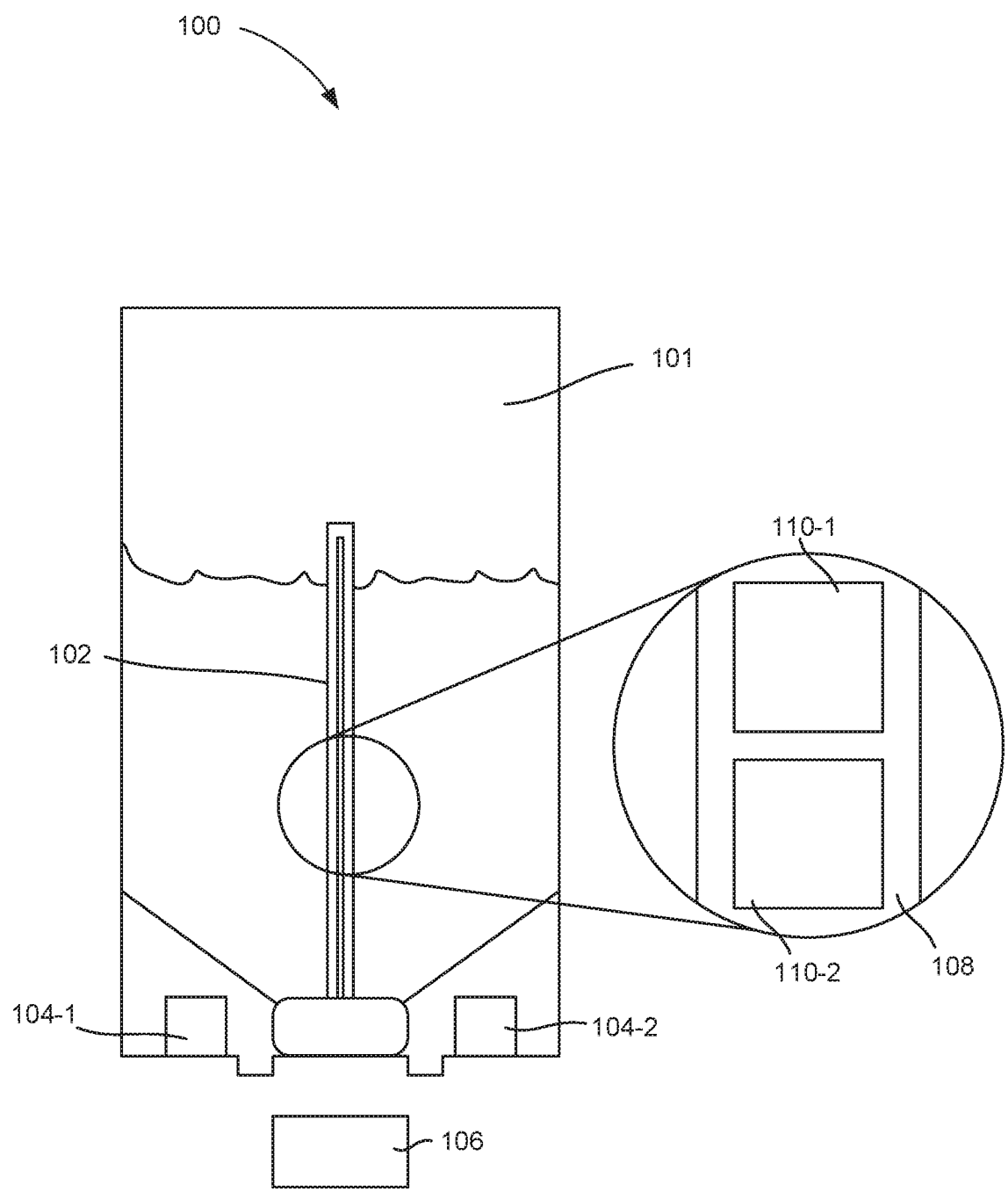
FIG. 1 is a cross-sectional view of a fluid reservoir having a fluid level sensing device disposed therein, according to an example of the principles described herein.

Fluid reservoirs are used to hold various types of fluids. For example, in a printing system, an ink cartridge stores a volume of ink. This ink is passed to a printhead for ultimate deposition on a media to form text or images on the media.

As printing fluid is deposited on media, the fluid reservoir is depleted of printing fluid. Attempting to execute a printing operation when a fluid reservoir is empty can result in damage to the printing device, the printhead, or the reservoir itself. Moreover, print quality can suffer if printing is executed with a reduced amount of fluid in the reservoir. Still further, it may be inconvenient to a consumer if a fluid reservoir runs out and the consumer has not been able to adequately prepare, for example by purchasing additional fluid reservoirs. Such consumer inconvenience can lead to customer dissatisfaction and ultimate loss of profits by a manufacturer of the reservoir.

Accordingly, fluid level sensing devices can be used to detect the amount of fluid in a fluid reservoir. Such sensors indicate a level of fluid in the fluid reservoir in an attempt to provide helpful, accurate information regarding fluid levels. In the case of a printing system, such sensors can be used to estimate how much printing can be performed given the present level of ink in an ink reservoir. While such fluid level sensing devices can be helpful in indicating an amount of fluid, some characteristics reduce the sensing devices ability to accurately indicate a fluid level.

For example, certain circumstances may lead to falsely high fluid level measurements. As a specific example, an individual sensor that falls along the sensing die may at one point in time indicate no fluid is present at that particular location. At some subsequent point in time, a random fluid drop, or a meniscus of the fluid in the reservoir may cover that particular sensor which would then indicate fluid at that particular location, even though the main body of fluid is below that particular sensor. In another example, user manipulation, i.e., removal and agitation of the reservoir, could also lead to fluid covering a particular sensor, even though the corpus of the fluid is below that particular sensor. In these and other cases, a fluid level indication may be erroneously high, meaning it indicates more fluid is in the reservoir than is actually present in the reservoir. Such an erroneous indication could lead to user dissatisfaction as well as other complications. For example, if an ink level reading is falsely high, the corresponding printing device may continue to operate with less fluid than is indicated. If the actual ink level is too low, this could damage the printing device.

Accordingly, the present specification describes a fluid level sensing device that addresses these and other complications. Specifically, the present specification describes a device and method wherein once a particular fluid level sensor indicates there is no fluid at that particular location for a number of measurements, it is prevented from subsequently indicating there is fluid at that location. More specifically, the device is "locked in" to a "no fluid" state for subsequent readings. Doing so prevents inaccurate fluid level readings due to random drops, meniscuses, agitation of the reservoir and other scenarios that could lead to a falsely high fluid level reading. Also, locking in a write-once memory to a no fluid state reduces the time for subsequent fluid level measurement cycles as a quickened analysis of sensors that are in a no fluid state is provided. This specific disclosure provides for an automatic locking-in of a memory device to the no fluid state. In other words, the locking in of the write-once memory is performed independent of an issued write command.

Specifically, the present specification describes a fluid level sensing device. The fluid level sensing device includes a sensing die having a number of fluid level sensors disposed thereon. A number of control devices correspond to, and control, the number of fluid level sensors. A control device includes a comparing device to determine a state of a corresponding fluid level sensor. The state of the fluid level sensor is selected from the group consisting of a fluid state and a no fluid state. The control device also includes a non-volatile memory device to indicate whether the corresponding fluid level sensor is at the fluid state or the no fluid state. The control device also includes a locking device to irreversibly set the non-volatile memory device to the no fluid state independent of a write command from a controller.

The present specification also describes a method for controlling a fluid level sensor. According to the method, a state of the fluid level sensing device is determined. The state is selected from the group consisting of a fluid state and a no fluid state. Information indicative of the state of the fluid level sensor is passed to a controller. When the fluid level sensor is in a no fluid state, a non-volatile memory device corresponding to the fluid level sensor is irreversibly set to indicate that the fluid level sensor is in the no fluid state independent of a write command from the controller.

The present specification also describes a fluid reservoir. The reservoir includes a chamber to hold a volume of the fluid. A fluid level sensing device is disposed within the chamber. The fluid level sensing device includes a sensing die to extend into the chamber and multiple fluid level sensors disposed on the sensing die. Each of the multiple fluid level sensors is positioned at a different depth within the chamber. The device also includes multiple control devices disposed on the sensing die. Each of the control devices corresponds to one of the fluid level sensors. A control device includes a comparing device to determine a state of a corresponding fluid level sensor. The state of the fluid level sensor is selected from the group consisting of a fluid state and a no fluid state. A control device also includes a non-volatile memory device to indicate whether the corresponding fluid level sensor is at the fluid state or the no fluid state. The control devices also include a locking device to irreversibly set the non-volatile memory device to the no fluid state independent of a write command from a controller.

Using such a fluid level sensing device level 1) provides a low cost, high volume, and simple manufacturing process; 2) quickens the fluid level detection cycle; 3) locks in a no fluid state independent of a write signal from a controller; 4) indicates accurate fluid level and is robust against agitation of the reservoir, random fluid drops, and meniscuses that may be present in the container; 5) supports multiple processes for detecting fluid levels; and 6) results in increased customer satisfaction due to the increased performance. However, it is contemplated that the devices disclosed herein may provide useful in addressing other matters and deficiencies in a number of technical areas. Therefore the systems and methods disclosed herein should not be construed as addressing any of the particular matters.

As used in the present specification and in the appended claims, the term "state" indicates whether or not a particular fluid level sensor indicates fluid is present at the corresponding location. For example, a fluid level sensor in a "no fluid" state indicates that fluid is not covering a particular sensor and a "fluid" state indicates that fluid is covering the particular sensor. Similar to the fluid level sensor, a non-volatile memory device may also be in a "fluid" or "no fluid" state.

Further, as used in the present specification and in the appended claims, the term "independent of a write command" indicates that the non-volatile memory is locked in without receiving a separate write command from the controller.

Still further; as used in the present specification and in the appended claims, the term "write-once" memory refers to memory that may be written one time from its initial state. For example, the memory may initially be set to a first state. A write-once memory may be changed one time to a different state, but subsequent write operations are prevented.

Even further, as used in the present specification and in the appended claims, the term "fluid level" refers to a liquid level in a reservoir that is otherwise filled with air.

Yet further, as used in the present specification and in the appended claims, the term "a number of" or similar language is meant to be understood broadly as any positive number including 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language indicates that a particular feature, structure, or characteristic described in connection with that example is included as described, but may not be included in other examples.

Turning now to the figures, FIG. 1 is a cross-sectional view of a fluid reservoir (100) having a fluid level sensing device (102) disposed therein, according to one example of the principles described herein. A fluid reservoir (100) may be any container that holds a fluid. For example, a printing system implements a print cartridge, wherein the fluid stored therein is ink. The fluid reservoir (100) retains fluid and supplies it to a system for further operation. For example, a number of fluid connects (104-1, 104-2) in a printing system supply a printing fluid within the chamber (101) to a printhead to be ultimately deposited on a print media. As fluid is used, it is depleted from the fluid reservoir (100). Accordingly, a fluid level sensing device (102) allows for an accurate indication of the fluid level within the fluid reservoir (100). Moreover, the fluid level sensing device (102) of the present specification which includes control devices to protect against erroneous fluid level indications provides even more accurate fluid level indications and a quickened fluid level determination.

The fluid level sensing device (102) includes a sensing die (108) that has a number of fluid level sensors (110) disposed thereon. As can be seen in FIG. 1, the sensing die (108) extends into a volume of the chamber (101) containing the fluid. The sensing die (108) supports the fluid level sensors (110) that extend along a length of the sensing die (108). The fluid level sensors (110) detect a fluid level. The fluid level sensing device (102) supports various types of fluid level sensors (110).

For example, in one type of fluid level sensor (110), pairs of heaters and heat sensors may be used. In this example, each of the heat sensors is sufficiently close to a corresponding heater such that the heat sensor may detect or respond to the transfer of heat from the associated or corresponding heater. Each of the heat sensors outputs a signal which indicates or reflects the amount of heat transmitted to the particular heat sensor following and corresponding to a pulse of heat from the associated heater. The amount of heat transmitted to the associated heat sensor will vary depending upon the medium through which the heat was transmitted prior to reaching the heat sensor. For example, liquid has higher heat capacity than air so it will decrease the temperature detected by a heat sensor. If the level of fluid within the chamber (101) is such that fluid surrounds a particular heater and its associated heat sensor, heat transfer from the particular heater to the associated heat sensor will be less as compared to circumstances where air is extending between the particular heater and its associated heat sensor.

Based upon the amount of heat sensed by the associated heat sensor following the emission of the heat pulse by the associated heater, the controller determines whether air or liquid surrounds the particular heater and the associated heat sensor. Using this determination and the known location of the heater and/or heat sensor along the sensing die (108) and the relative positioning of the sensing die (108) with respect to the floor of the chamber (101), the controller determines the level of fluid within the chamber (101). Based upon the determined level of fluid within the chamber (101) and the characteristics of the chamber (101), the controller is further able to determine the actual volume or amount of fluid remaining within the chamber (101).

Another example of a type of fluid level sensor (110) is an impedance level sensor (110) which detects the capacitance of a fluid that surrounds the fluid level sensor (110). As fluid conducts electricity at a different rate then air, the conductivity between fluid level sensors (110) can be used to determine whether the conducting medium is air or fluid. Yet another example is an optical sensor, wherein photodiodes distributed along the sensing die (108) are paired with a single, or multiple light emitting elements. If light is collected at a particular diode; it indicates that fluid is not present at that level. While specific reference is made to a few particular types of fluid level sensors (110), varying types of fluid level sensors (110) may be used in accordance with the fluid level sensing device (102) of the present specification.

For simplicity, in FIG. 1 a few fluid level sensors (110-1, 110-2) are depicted, but the fluid level sensors (110-1, 110-2) may extend along a length of the sensing die (108). Note also that the fluid level sensors (110-1, 110-2), as depicted in at least FIG. 1 are not to scale and are enlarged to show their presence on the sensing die (108).

As depicted in FIG. 1, the fluid level sensing device (102) is disposed within the chamber (101). As will be described below, the fluid level sensing device (102) has electrical interconnects to output data collected from the number of sensors (110). These electrical interconnects of the fluid level sensing device (102) mate, and electrically couple, with a corresponding electrical interconnect (106) on a separate component such that data collected from the fluid level sensing device (102) can be passed to a corresponding system and analyzed and used to control operation of the associated system.

Figure 2:
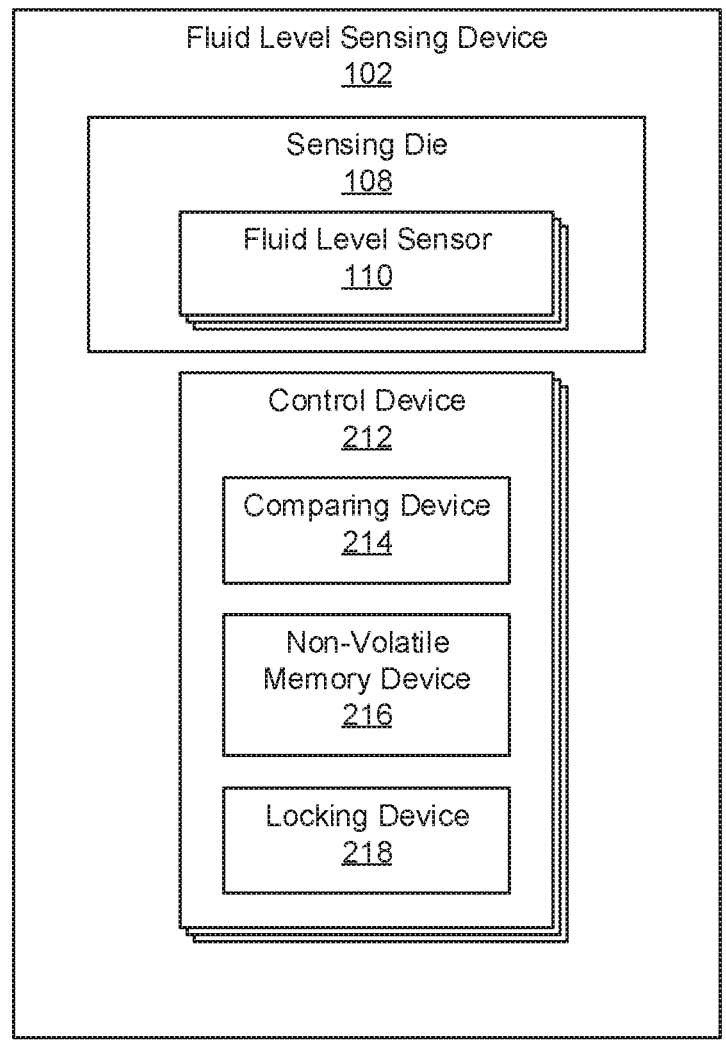
FIG. 2 is a block diagram of the fluid level sensing device, according to an example of the principles described herein.

FIG. 2 is a block diagram of the fluid level sensing device (102), according to an example of the principles described herein. As described above, the fluid level sensing device (102) has a sensing die (108) with a number of fluid level sensors (110) disposed thereon. The sensing die (108) is a rigid member that provides mechanical support for the fluid level sensors (110). The sensing die (108) may be formed of any number of materials including plastic, silicon, glass polymers, FR4, glass-reinforced epoxy laminate sheet, tub, rod, or printed circuit board, or other rigid member. In one example, the sensing die (108) includes a composite material of woven fiberglass cloth with an epoxy resin binder. In another example, the sensing die (108) is a printed circuit board having embedded electrical traces and contact pads to facilitate electrical connection between various components mounted on the sensing die (108).

The sensing die (108) extends into the chamber (FIG. 1, 101) that contains the fluid. The fluid level sensors (110) may extend along a length of the sensing die (108) and accordingly correspond to different depths within the chamber (FIG. 1, 101) in which they are disposed. The fluid level sensors (110) may be of varying type and are used to detect a level of fluid within the chamber (FIG. 1, 101). For example, if a first fluid level sensor (110) detects fluid at a first level and an immediately adjacent fluid level sensor (110), for example one that is at a higher position than the first fluid level sensor (110), detects no fluid; then a determination can be made that the level of fluid within the chamber (FIG. 1, 101) is somewhere between those two sensors. The fluid level sensors (110) may be placed relatively close to one another. For example, there may be at least 100 fluid level sensors (110) per inch along the sensing die (108). With such a resolution, accurate detection of fluid levels within a chamber (FIG. 1, 101) is attainable.

These fluid level sensors (110) then pass that data to be output to an external device that can use the data. For example, the fluid level data gathered from the fluid level sensors (110) can be passed to the user to indicate to the user when the fluid reservoir (FIG. 1, 100) is to be refilled or replaced. Still further, the data collected could be used by a printing system to prevent the printing system from depositing ink on a print media when the fluid level sensors (110) indicate that the fluid level in the fluid reservoir (FIG. 1, 100) is below a threshold level.

The fluid level sensing device (102) also includes a number of control devices (212). The control devices (212) correspond to the fluid level sensors (110). For example, a fluid level sensing device (102) that has 100 fluid level sensors (110), also would have 100 control devices (212). In some examples, the control device (212), which may include hardware and other circuitry, may be disposed on the sensing die (108). In other examples, the control devices (212) may be disposed on another substrate. The control devices (212) include components and other devices that assist in the detection of fluid at a particular sensor and other controlling operations. For example, the number of control devices (212) may assist in the locking in of a non-volatile memory device (216) of the system to a no fluid state.

Specifically, the control device (212) includes a comparing device (214) that determines a state of a corresponding fluid level sensor (110). More specifically, a fluid level sensor (110) may have at least two states: a fluid state wherein the fluid level sensor (110) indicates fluid at a particular location along the sensing die (108) and a no-fluid state wherein the fluid level sensor (110) indicates that fluid is not found at that particular location along the sensing die (108). The comparing device (212) therefore includes hardware and circuitry to determine which of these states a corresponding fluid level sensor (110) is in. The comparing device (214) may initiate an operation wherein the non-volatile memory device (216) state is irreversibly set to indicate that fluid is not present at a location identified by the corresponding fluid level sensor (110). A specific example of a comparing device (214), and the control device (212) in general, is provided below in connection with FIGS. 5A and 5B.

The control device (212) also includes a non-volatile memory device (216). A non-volatile memory refers to hardware and circuitry that can store information even after having been power cycled. In other words, the non-volatile memory device (216) is not dependent upon electrical power to store information. The non-volatile memory device (216) can also have multiple states. For example, corresponding to the fluid level sensor (110), a non-volatile memory device (216) may be in a "fluid" state when it indicates that the corresponding fluid level sensor (110) is also in a fluid state. Similarly, a non-volatile memory device (216) may be in a "no fluid" state when it indicates that the corresponding fluid level sensor (110) is in a no fluid state.

The non-volatile memory device (216) may be a write-once memory device, meaning that from its initial state, the non-volatile memory device (216) may be changed one time and subsequent attempts to change the write-once memory device are prevented. In using, a write-once non-volatile memory device (216) errant fluid level readings can be prevented. For example, in an initial state a non-volatile memory device (216) may be in a "fluid" state indicating that a corresponding fluid level sensor (110) is in the presence of fluid in the chamber (FIG. 1, 101). As the fluid level drops, a fluid level sensor (110) changes from a fluid state to a no fluid state, which includes writing the memory device. A write-once memory device prevents subsequent changing of state of the memory device, i.e., from a no fluid state back to a fluid state.

Accordingly, inadvertent misreadings are avoided and malicious attempts to circumvent accepted fluid level measurement are prevented. Accordingly, with a write-once non-volatile memory device (216) any subsequent attempts to determine fluid level at that particular fluid level sensor (110) will return a no fluid state. A specific example of a non-volatile memory device (216), and specifically of a write-once non-volatile memory device (216), is provided below in connection with FIGS. 5A and 5B.

The control device (212) also includes a locking device (218) to irreversibly set the non-volatile memory device (216) to the no fluid state independent of a write command from an external controller. More specifically, the locking device (218) may be any component that can permanently write the non-volatile memory device (216) to a new state. Of particular relevance, the locking device (218) may do so independent of a write command from a controller. For example, a locking device (218) that has to receive a separately transmitted write command, for example in addition to a sensor select signal, is not performing such an irreversible setting operation independent of a write command. Accordingly, the locking device (218) may irreversibly set the non-volatile memory device (216) to a no fluid state without a separately issued write command from a controller.

The present fluid level sensing device (102) therefore allows for a "locking in" of a state for a fluid level sensor (110). Accordingly, any subsequent reads of this fluid level sensor (110) data will return a no fluid state, Doing so prevents erroneously high fluid level measurements and also increasingly reduces the amount of time to determine fluid level. More specifically, as sequential fluid level sensors (110) returns a no fluid state on account of fluid continually dropping within the reservoir (FIG. 1, 100), an iteratively smaller subset of fluid level sensors (110) will be tested.

Figure 3:
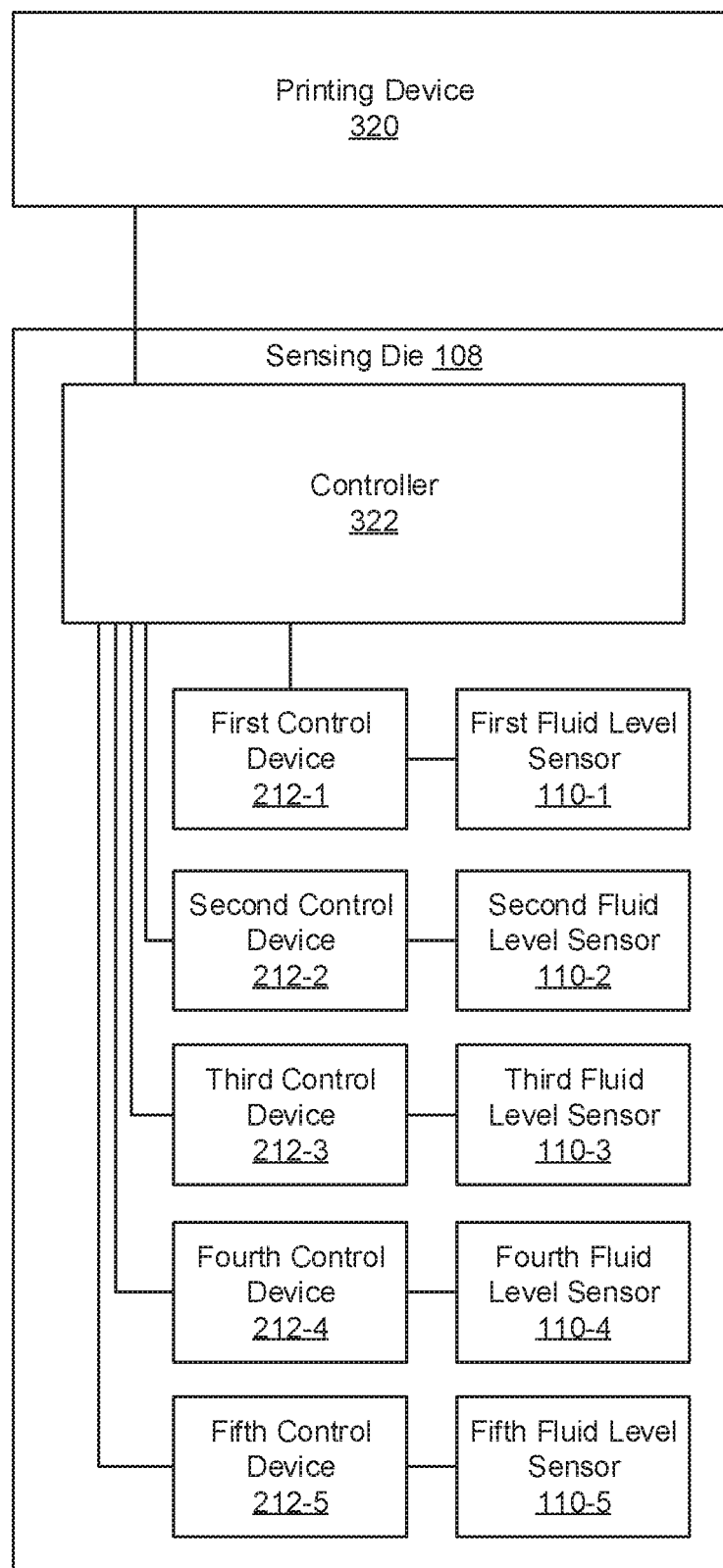
FIG. 3 is a diagram of a system for implementing the fluid level sensing device, according to an example of the principles descried herein.

FIG. 3 is a diagram of a system for implementing the fluid level sensing device (FIG. 1, 102), according to an example of the principles described herein. As described above, the fluid level sensing device (FIG. 1, 102) includes a sensing die (108) having a number of fluid level sensors (110) disposed thereon and a corresponding number of control devices (212). While FIG. 3 depicts five sensor/control device pairs, any number of sensor/control device pairs may be implemented in accordance with the principles described herein.

In some examples, the fluid level sensing device (FIG. 1, 102) also includes a controller (322). The controller (322) is coupled to the various control devices (212) as well as to a separate device such as a printing device (320). Note that the connecting lines do not indicate a number of physical connections, but rather a logical connection between components. In other words, while a single line is present between the controller (322) and the first control device (212-1), any number of signals may be passed between the two. For example, the controller (322) may, on one channel, send a select signal to the first control device (212-1) instructing the first control device (212-1) to return a fluid level for the corresponding first fluid level sensor (110-1). That same first control device (212-1) may send a returned value indicating the state of the first fluid level sensor (110-1) back to the controller (322) on a different channel.

In the system depicted in FIG. 3, a printing device (320), or any other such device that cooperates with a reservoir (FIG. 1, 100) that holds fluid, can instruct the controller (322) to perform a fluid level measurement operation. In some examples, the signal from the printing device (320) can select a particular sensor (110). In other examples, the signal from the printing device (320) generally initiates a fluid level determination, and the controller (322) sequentially selects particular sensors (110) to evaluate.

The controller (322) sends a signal to select the corresponding control device (212) and the corresponding control device (212) initiates a process to determine whether the corresponding fluid level sensor (110) is in a fluid state or a no fluid state. Regardless of the state, this value is then passed back to the printing device (320) via the controller (322). If the returned state happens to be a no fluid state, the control device (212) initiates an operation to permanently lock in the non-volatile memory device (FIG. 2, 216) to a no fluid state. Accordingly, any subsequent requests from the printing device (320) to select and test that particular fluid level sensor (110) will be bypassed, and a return result of no fluid will be returned. In some examples, the controller (322) sequentially selects a fluid level sensor (110) to be tested. More specifically, the controller (322) may start with a highest elevation sensor, i.e., the first fluid level sensor (110-1) and sequentially test the remaining sensors (110) until an indication of a sensor (110) in a fluid state is returned.

The controller (322) also provides a threshold value to facilitate detecting whether the corresponding fluid level sensor (110) is in a fluid state or a no fluid state. For example, output from a fluid level sensor (110) may be in the form of a voltage with a low voltage indicating fluid is present. The controller (322) can pass a threshold voltage to the control device (212). If the voltage from the fluid level sensor (110) is less than the threshold voltage, then it is determined that the corresponding fluid level sensor (110) is in a fluid state, i.e., fluid is present at the fluid level sensor (110). By comparison, if the voltage from the fluid level sensor (110) is greater than the threshold voltage, then it is determined that the corresponding fluid level sensor (110) is in a no fluid state, i.e., fluid is not present at the fluid level sensor (110).

Figure 4:
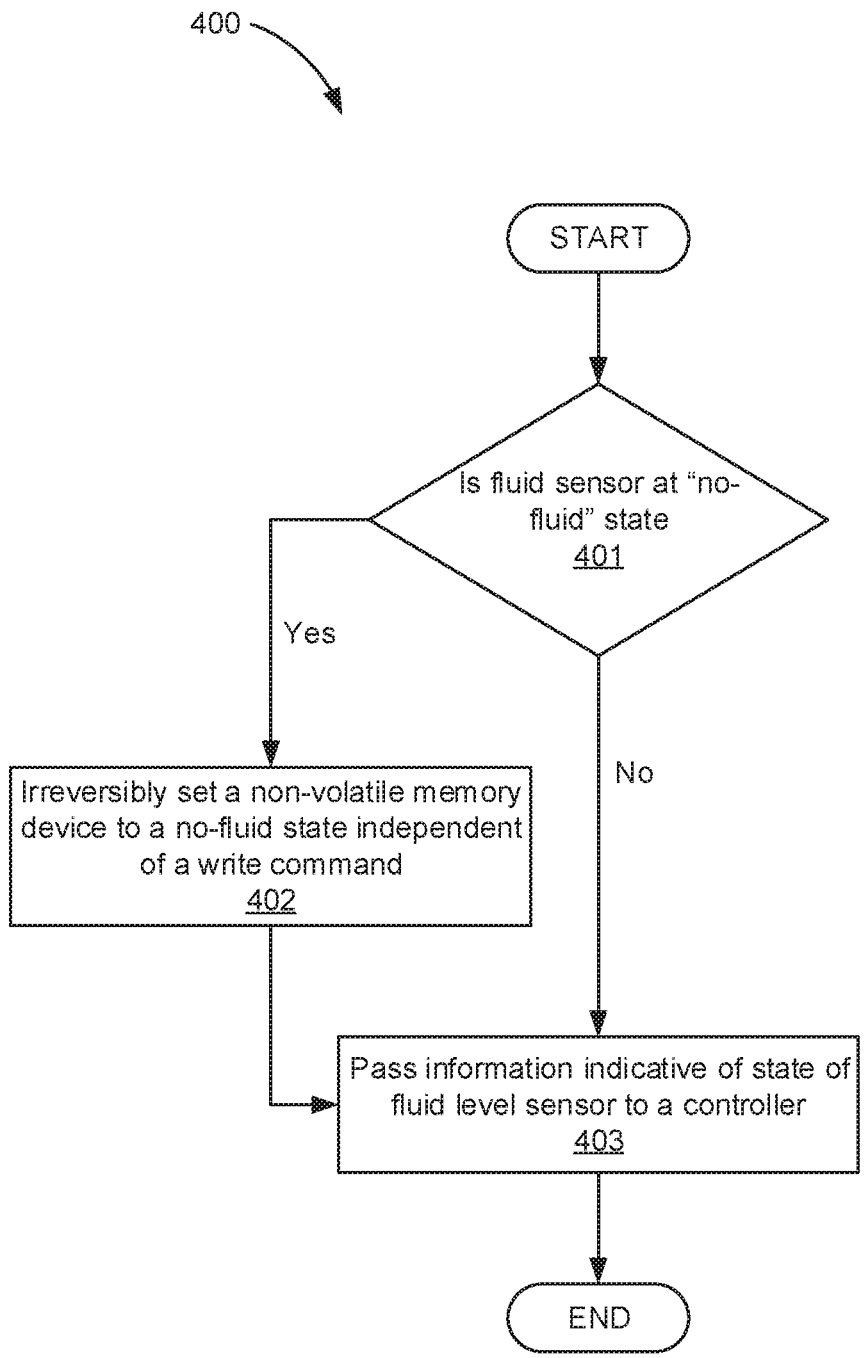
FIG. 4 is flowchart illustrating a method for controlling a fluid level sensing device, according to an example of the principles described herein.

FIG. 4 is a flowchart illustrating a method (400) for controlling a fluid level sensing device (FIG. 1, 102), according to an example of the principles described herein. According to the method (400), it is determined (block 401) whether a fluid level sensor (FIG. 1, 110) is in a no fluid state or a fluid state. This may be done for example, by receiving information from the fluid level sensor (FIG. 1, 110) and comparing it to a threshold value. More specifically, the information received form the fluid level sensor (FIG. 1, 110) may be a voltage value that when compared against a threshold voltage indicates whether or not the corresponding fluid level sensor (FIG. 1, 110) is in a no fluid state or a fluid state.

If the fluid level sensor (FIG. 1, 110) is in a fluid state (block 401, determination NO), information indicative of the state of the fluid level sensor (FIG. 1, 110) is passed (block 403) to the controller (FIG. 3, 322). Such information may be a voltage value. In one particular example, no voltage being passed to the controller (FIG. 3, 322) indicates that the fluid level sensor (FIG. 1, 110) is in a fluid state.

Figure 5A:
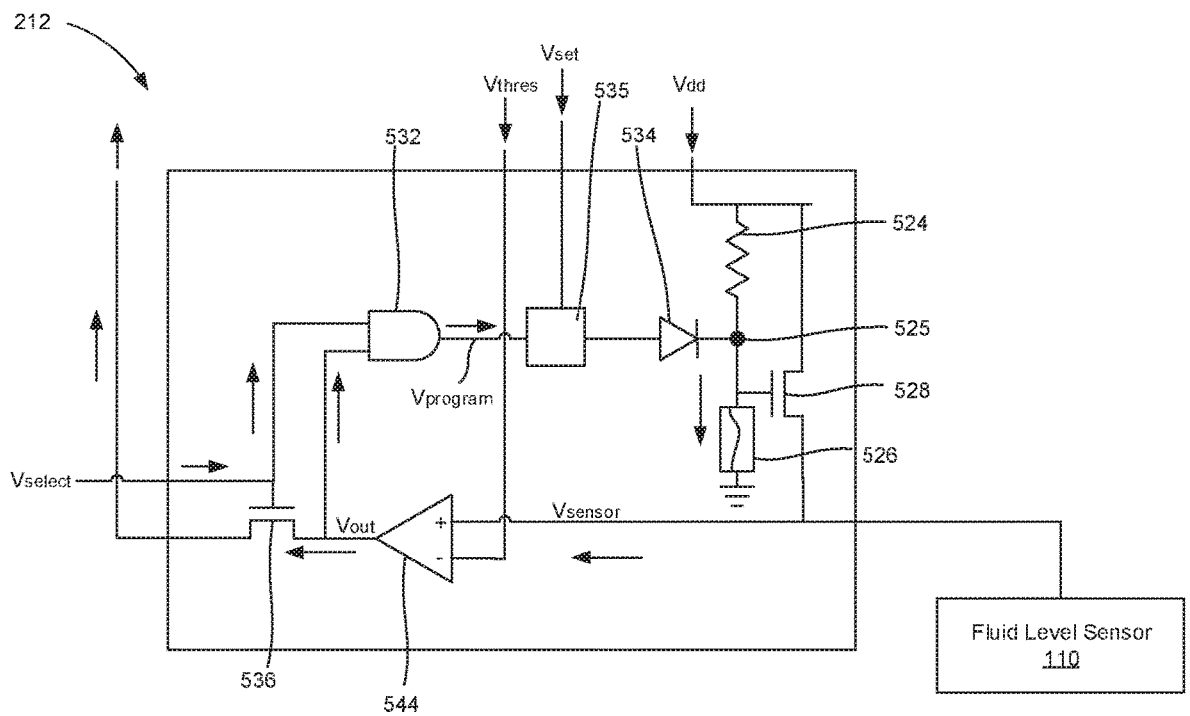
FIGS. 5A and 5B are examples of a control device of a fluid level sensing device, according to examples of the principles described herein.
Figure 5B:
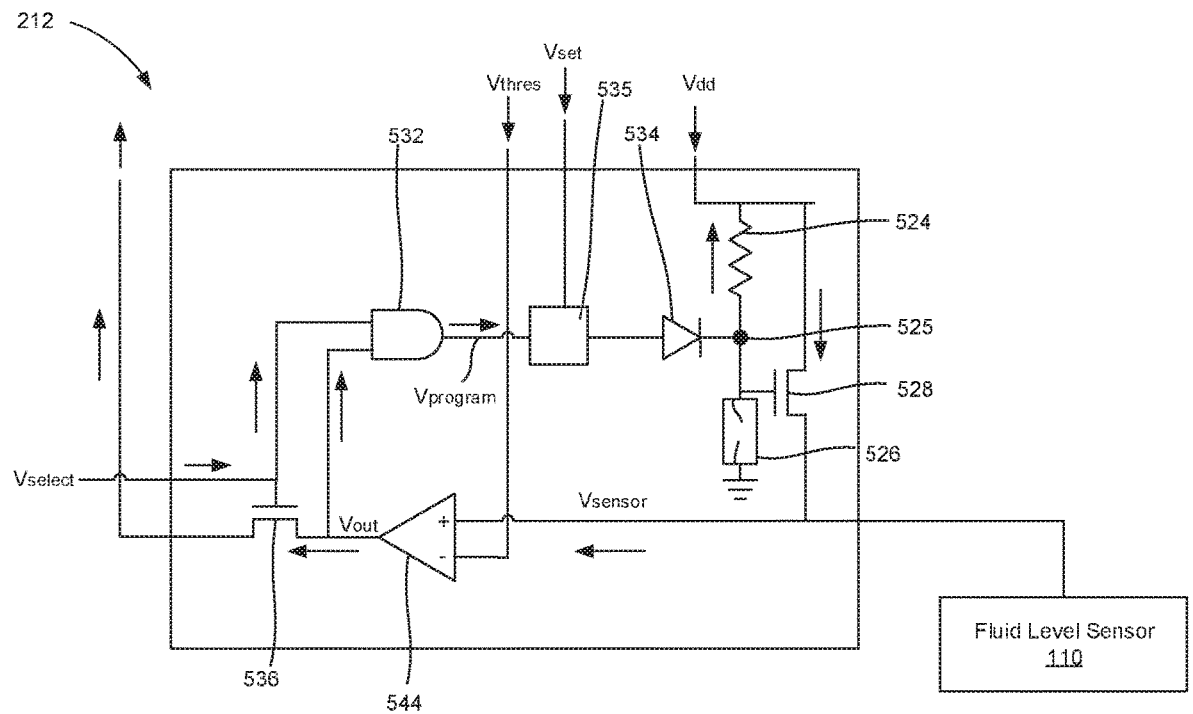

If the fluid level sensor (FIG. 1, 110) is in a no fluid state (block 401, determination YES), a state of the non-volatile memory device (FIG. 2, 216) may be irreversibly set (block 402) to a no fluid state. Such an irreversible setting of the state of the non-volatile memory device (FIG. 2, 216) may be independent of a write command. For example, as indicated above in regards to FIG. 3, the controller (FIG. 3, 322) may communicate various signals to the control device (FIG. 2, 212) such as a signal to select a corresponding control device (FIG. 2, 212)/fluid level sensor (FIG. 1, 110)

pair, and a threshold value against which data from a fluid level sensor (FIG. 1, 110) is compared to determine a state of the fluid level sensor (FIG. 1, 110). However, according to the present method (400), no additional signal, specifically no additional write signal, is passed from the controller (FIG. 3, 322) to the control device (FIG. 2, 212). In some examples, the irreversible setting (block 402) of the non-volatile memory device (FIG. 2, 216) comes after a number of measurements. For example, as depicted in FIGS. 5A and 5B, a counter could be included and each time the fluid level sensor (FIG. 1, 110) indicates no fluid, the counter may increment upwards. After N number of "fluid" state measurements, the locking device (FIG. 2, 218) locks in the non-volatile memory device (FIG. 2, 216) is irreversibly set. A specific example of how the non-volatile memory device (FIG. 2, 216) is irreversibly set (block 402) to a no fluid state independent of a write command is provided in connection with FIG. 5.

FIGS. 5A and 5B are examples of control devices (212) of a fluid level sensing device (FIG. 1, 102), according to examples of the principles described herein. Specifically, FIG. 5A depicts the control device (212), and data transfer, when the fluid level sensor (110) indicates it is in a fluid state and FIG. 5B depicts the control device (212), and data transfer, when the fluid level sensor (110) indicates that it is in a no fluid state. As depicted in FIGS. 5A and 5B, the non-volatile memory device (FIG. 2, 216) may include at least a resistive device (524), a fuse (526), and a memory transistor (528). The locking device may include at least a sensing transistor (536), a logic "AND" device (532), and a diode (534). In FIGS. 5A and 5B, the various arrows indicate the flow of current through the circuit. Also in FIGS. 5A and 5B, a low voltage may be represented by a logic 0 and a high voltage may be represented by a logic 1.

In the example depicted in FIG. 5A, the fluid level sensor (110) is in a fluid state. Accordingly, $V_{sensor}$ passing out of the fluid level sensor (110) will be lower than a voltage passed when fluid is not present. At the same time, the controller (FIG. 3, 320) supplies the comparator (544) of the control device (212) with a threshold voltage, $V_{thres}$. $V_{thres}$ may be set such that it is greater than $V_{sensor}$ when $V_{sensor}$ is indicating fluid at the corresponding fluid level sensor, i.e., a lower value of $V_{sensor}$. As the positive terminal of the comparator (544) is a lower value than the negative terminal, an output of the comparator (544), $V_{out}$ will also be a low voltage, i.e., logic 0.

As described above, a determination of the state of the fluid level sensor (110) and passing of such information to the controller (FIG. 3, 320) is responsive to the corresponding control device (212) being selected. Accordingly, the controller (FIG. 3, 320) may pass a select signal, $V_{select}$, which may be a high voltage, i.e., logic 1. The select signal, $V_{select}$ closes the select transistor (536) such that the output, $V_{out}$, of the comparator (544) can be passed to the controller (FIG. 3, 320). Accordingly, a low voltage output $V_{out}$ from the comparator (544) is passed to the controller (FIG. 3, 320) thus indicating the fluid state of the fluid level sensor (110).

The select signal and the output of the comparator are also passed to the logic "AND" device (532). The logic "AND" device (532) outputs a high voltage, i.e., logic 1, when both inputs are at a high voltage, i.e., logic 1. The output of the logic AND device (532) is referred to as $V_{program}$. As $V_{out}$ is low i.e., logic 0, $V_{program}$ is also low, i.e., logic 0.

The diode (534) of the circuit prevents the memory node (525) from being pulled low by the AND device (532) once the fuse (526) is blown. In other words, the diode (534) prevents a fight from occurring between the pull-up resistor (524) and the logic AND device (532) when the logic AND device (532) is driving a logic 0.

As described above, the non-volatile memory device (FIG. 2, 216) includes a fuse (526). The fuse (526) may be configured such that a $V_{program}$ based on the logical "AND-"ing of $V_{select}$ and a low $V_{out}$ does not blow the fuse (526). When intact, the fuse (526) pulls the memory node (525) down, and preventing any current from closing the gate of the memory transistor (528). Thus, the memory transistor (528) is in an off state when the fluid level sensor (110) is in a fluid state. In this example, the signal $V_{dd}$ is not coupled to the positive node of the comparator (544) through the memory transistor (528). Thus, when the fluid level sensor (110) is in a fluid state the output of the comparator (544), $V_{out}$ will be low and this will be passed to the controller (FIG. 3, 320) to indicate that the fluid level sensor (110) is in a fluid state.

In some examples, the control device (212) also includes a counter (535). In using the counter (535), a certain number of high $V_{program}$ signals would be output before the fuse (526) is burnt open. For example, a selectable number, N, of high value $V_{program}$ signals could be initially set. Every time, a high $V_{program}$ signal is passed, it is counted. The input of the diode (534) then is driven after the $N^{th}$, high $V_{program}$ signal is passed. The selectable number can be controlled by the $V_{set}$ line input into the counter (535). Using such a counter (535) increases the accuracy of the fluid level detection by avoiding false positives.

In the example, depicted in FIG. 5B, the fluid level sensor (110) is in a no fluid state. Accordingly, $V_{sensor}$ passing out of the fluid level sensor (110) will be higher than a voltage passed when fluid is present. At the same time, the controller (FIG. 3, 320) supplies the comparator (544) of the control device (FIG. 2, 212) with the threshold voltage, $V_{thres}$. $V_{thres}$ may be set such that it is less than $V_{sensor}$ when $V_{sensor}$ is indicating no fluid is at the corresponding fluid level sensor (110). As the positive terminal of the comparator (544) is a greater value than the negative terminal, an output of the comparator (544), $V_{out}$ will also be a high voltage, i.e., logic 1.

As in FIG. 5A, $V_{select}$ closes the select transistor (536) such that the output $V_{out}$ of the comparator (544) can be passed to the controller (FIG. 3, 320). Accordingly, a high voltage output $V_{out}$ from the comparator (544) is passed to the controller (FIG. 3, 320) thus indicating the no fluid state of the fluid level sensor (110).

The select signal and the output of the comparator (544) are also passed to the logic "AND" device (532) which outputs a high voltage, i.e., logic 1 when both inputs are at a high voltage, i.e., logic 1. As $V_{out}$ is high i.e., logic 1, $V_{program}$ is also high, i.e., logic 1. As described above, the non-volatile memory device (FIG. 2, 216) includes a fuse (526). The fuse (526) may be configured such that a $V_{program}$ based on the logical "AND"ing of $V_{select}$ and a high $V_{out}$ burns out the fuse (526). When intact, the fuse (526) pulls the memory node (525) down, thus preventing any current from closing the gate of the memory transistor (528).

However, when, $V_{program}$ is high, as for example when a high $V_{out}$ and $V_{select}$ are combined such as when the fluid level sensor (110) is in a no fluid state, the fuse (526) is burned out as indicated in FIG. 5B. In this example with a blown fuse (526), the memory transistor (528) closes and voltage $V_{dd}$ is coupled to the source of the memory transistor (528). As the voltage $V_{dd}$ is coupled with $V_{sensor}$ through the memory transistor (528), the output of the comparator (544), $V_{out}$, will subsequently always be high. In other words, using the circuit described herein, once a fluid level sensor (110) indicates a "no fluid" state, it will forever yield a "no fluid" state. Thus the specific circuit described in FIGS. 5A and 5B allows for an irreversible setting of a non-volatile memory device (FIG. 2, 216) to a no fluid state thus preventing inadvertent or intentional interference with proper fluid level sensing.

While FIGS. 5A and 5B depict one particular configuration of circuitry making up the control device (212), other configurations, and circuitry elements could be used to carry out the comparison, storage, and locking in functions.

Figure 6:
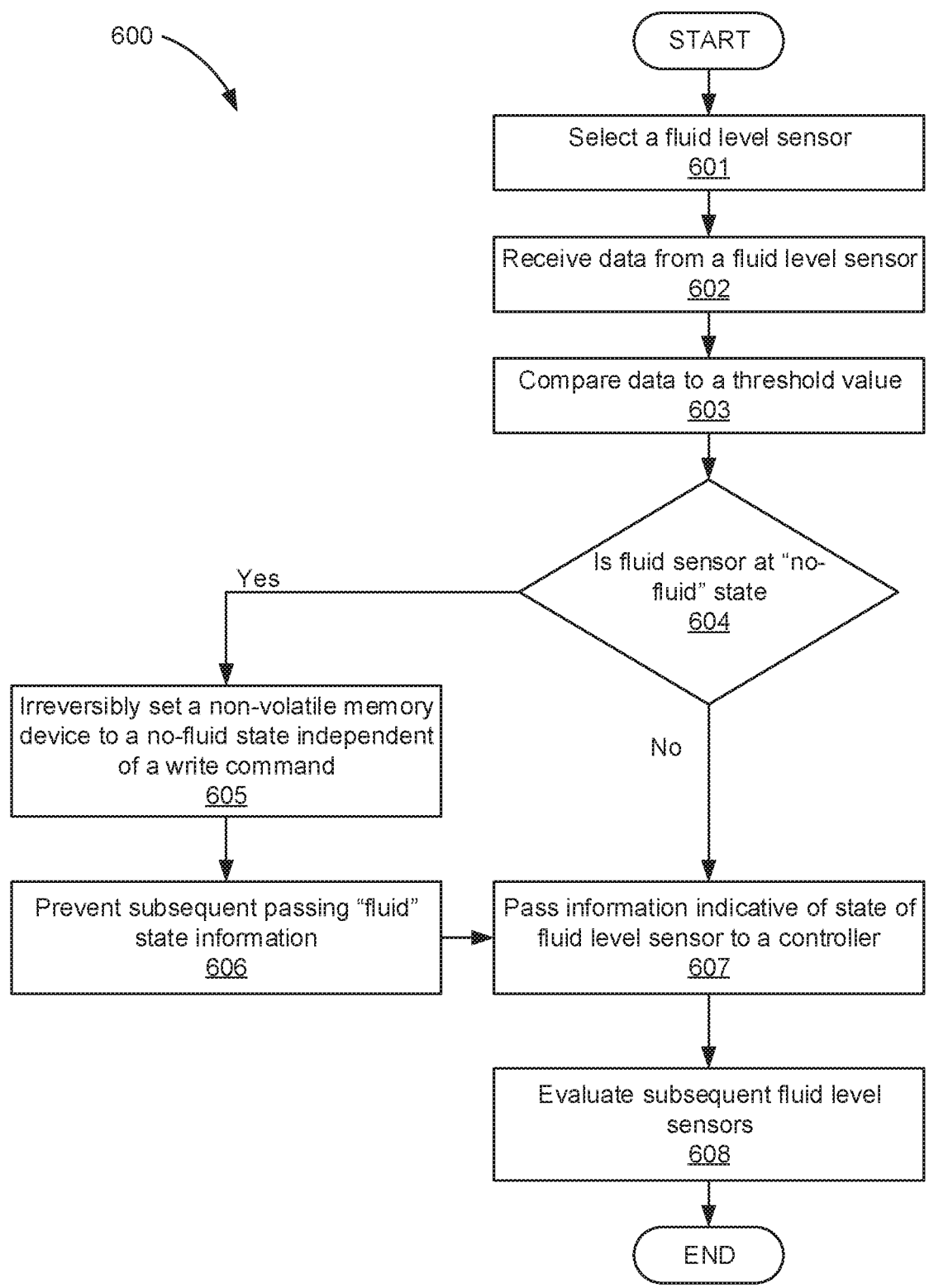
FIG. 6 is a flowchart illustrating a method for controlling a fluid level sensing device, according to an example of the principles described herein.

FIG. 6 is a flowchart illustrating a method (600) for controlling a fluid level sensing device (FIG. 1, 102), according to an example of the principles described herein. According to the method (600) a fluid level sensor (FIG. 110) to be evaluated is selected (block 601) from a number of fluid level sensors (FIG. 1, 110). In some examples, the selection may be responsive to a control signal received from a printing device (FIG. 3, 320). For example, a printing device (FIG. 3, 320) may select the particular fluid level sensor (FIG. 1, 110) to test. In another example, the printing device (FIG. 3, 320) merely determines it is time to determine a fluid level and sends this instruction to the controller (FIG. 3, 322). The controller (FIG. 3, 322) then selects (block 601) the particular fluid level sensor (FIG. 1, 110) to evaluate. In some examples, evaluation of the state of the multiple fluid level sensors (FIG. 1, 110) may be sequential. As an example, the first fluid level sensor (FIG. 1, 110) evaluated may be a highest sensor within the chamber (FIG. 1, 101). The testing of individual fluid level sensors (FIG. 1, 110) proceeds downward from that point.

Next, a corresponding control device (FIG. 2, 212) receives (block 602) data from the selected fluid level sensor (FIG. 1, 110). As described above, this may be in the form of a voltage that indicates whether the particular fluid level sensor (FIG. 1, 110) is detecting fluid at a particular location. This data is then compared (block 603) to a threshold value. For example, the voltage from the fluid level sensor (FIG. 1, 110) is compared to a threshold voltage, which threshold voltage is established such that a lower value indicates the fluid level sensor (FIG. 1, 110) detects fluid, and a greater value indicates the fluid level sensor (FIG. 1, 110) does not detect fluid.

The corresponding control device (FIG. 2, 212) then determines (block 604) if the fluid level sensor (FIG. 1, 110) is at a no-fluid state. This may be performed as described in connection with FIG. 4. If the corresponding fluid level sensor (FIG. 1, 110) is in a fluid state (block 604, determination NO), information indicative of the state of the fluid level sensor (FIG. 1, 110) is passed (block 607) to the controller (FIG. 3, 320). This may be performed as described in connection with FIG. 4.

If the corresponding control device (FIG. 2, 212) determines that the corresponding fluid level sensor (FIG. 1, 110) is in a no fluid state (block 604, determination YES), the control device (FIG. 2, 212) irreversibly sets (block 605) a non-volatile memory device (FIG. 2, 216) to a no fluid state independent of a write command. This may be performed as described in connection with FIG. 4.

The control device (FIG. 2, 212) then prevents (block 606) subsequent passing of information indicative that the selected fluid level sensor (FIG. 1, 110) is in a fluid state. In other words, all subsequent indications of fluid state for that particular fluid level sensor will be "no fluid" as opposed to "fluid." In the example depicted in FIG. 5B, this is effectuated by the blowing of the fuse (FIG. 5, 526). Such prevention ensures that an accurate fluid level is provided to a user as opposed to one effected by random fluid drops, meniscuses, agitation of the reservoir (FIG. 1, 100). The no-fluid state information is then passed (block 607) to the controller (FIG. 3, 320).

The method (600) continues by evaluating (block 608) subsequent fluid level sensors (FIG. 1, 110), Evaluation (block 608) of a fluid level sensor (FIG. 1, 110) refers to the determination of a state of a fluid level sensor (FIG. 1, 110) and subsequent passing of the state information to the controller (FIG. 3, 322). Once all fluid level sensors (FIG. 110) have been evaluated, the controller (FIG. 3, 322) or a controller of the print device (FIG. 3, 320) can determine the fluid level.

Using such a fluid level sensing device level 1) provides a low cost, high volume, and simple manufacturing process; 2) quickens the fluid level detection cycle: 3) locks in a no fluid state independent of a write signal from a controller; 4) indicates accurate fluid level and is robust against agitation of the reservoir, random fluid drops, and meniscuses that may be present in the container; 5) supports multiple processes for detecting fluid levels; and 6) results in increased customer satisfaction due to the increased performance. However, it is contemplated that the devices disclosed herein may provide useful in addressing other matters and deficiencies in a number of technical areas. Therefore the systems and methods disclosed herein should not be construed as addressing any of the particular matters.

The preceding description has been presented to illustrate and describe examples of the principles described. This description is not intended to be exhaustive or to limit these principles to any precise form disclosed. Many modifications and variations are possible in light of the above teaching.

What is claimed is:

1. A fluid sensing device comprising:
a sensing die having an array of multiple fluid level sensors disposed thereon;
a corresponding number of control devices, each control device corresponding to one of the number of fluid level sensors; each control device comprising:
a comparing device to determine a state of a corresponding fluid level sensor, wherein the state of the fluid level sensor is selected from the group consisting of a fluid state and a no fluid state;
a non-volatile memory device to indicate whether the corresponding fluid level sensor is at the fluid state or the no fluid state; and
a locking device to irreversibly set the non-volatile memory device to the no fluid state independent of a write command from a controller.

2. The device of claim 1, wherein the fluid is ink.

3. The device of claim 1, wherein the non-volatile memory device comprises a memory node between a fuse and diode, wherein the diode prevents the memory node from being pulled low when the fuse is blown.

4. The device of claim 3, further comprising a logic AND device connected to provide a signal through the diode to the memory node.

5. The device of claim 1, further comprising the controller to:
select the corresponding fluid level sensor for evaluation; and
provide a threshold value to facilitate detecting whether the corresponding fluid level sensor is at the fluid state or the no fluid state.

6. The device of claim 5, wherein the controller sequentially selects fluid level sensors from multiple fluid level sensors for evaluation.

7. The device of claim 1, wherein:
the non-volatile memory device comprises at least a resistive device, a fuse, and a memory transistor; and
the locking device comprises at least a sensing transistor, a logic AND device, and a diode.

8. The device of claim 1, wherein the non-volatile memory device comprises a fuse and a memory transistor.

9. The device of claim 1, wherein the locking device comprises a logic AND device.

10. The device of claim 1, wherein each fluid level sensor is connected to transmit a signal to its separate, corresponding control device for input to the comparing device of the corresponding control device.

11. A method for controlling a fluid level sensor comprising:
determining a state of the fluid level sensor, wherein the state of the fluid level sensor is selected from the group consisting of a fluid state and a no fluid state;
when the fluid level sensor is in the no fluid state, irreversibly setting a non-volatile memory device corresponding to the fluid level sensor to indicate that the fluid level sensor is in the no-fluid state independent of a write command from the controller; and
passing information indicative of the state of the fluid level sensor to a controller.

12. The method of claim 11, wherein determining a state of the fluid level sensor comprises:
receiving data from the fluid level sensor; and
comparing the data from the fluid level sensor to a threshold value to determine whether the fluid level sensor is at the no fluid state.

13. The method of claim 12, further comprising determining to irreversibly set the non-volatile memory device after a threshold number of multiple indications that the fluid level sensor is in the no fluid state.

14. The method of claim 13, further comprising, with a counter, counting a number of times the fluid level sensor is determined to be in the no-fluid state and, when the counter reaches the threshold number of multiple indications that the fluid level sensor is in the no-fluid state, then irreversibly setting the non-volatile memory device corresponding to the fluid level sensor to indicate that the fluid level sensor is in the no-fluid state.

15. The method of claim 11, further comprising preventing subsequent passing of information indicative that the fluid sensor is in the fluid state to the controller.

16. The method of claim 11, further comprising:
selecting the fluid level sensor from a number of sensors; and
evaluating subsequent fluid level sensors.

17. The method of claim 11, wherein the non-volatile memory device comprises a fuse and wherein irreversibly setting the non-volatile memory device comprises blowing the fuse to indicate that the corresponding fluid level sensor is in the no fluid state.

18. The method of claim 11, further comprising, after determining a no-fluid state at the fluid level sensor, sending an electronic signal to the non-volatile memory device, that is separate from the fluid level sensor, to irreversibly set the non-volatile memory device to indicate that the fluid level sensor is in the no-fluid state.

19. A fluid reservoir comprising:
a chamber to hold a volume of the fluid; and
a fluid level sensing device disposed within the reservoir, wherein the fluid level sensing device comprises:
a sensing die to extend into the chamber;
multiple fluid level sensors disposed on the sensing die, each of the multiple fluid level sensors being positioned at a different depth within the chamber;
multiple control devices disposed on the sensing die, each of the control devices corresponding to one of the fluid sensors, wherein a control device comprises:
a comparing device to determine a state of a corresponding fluid level sensor, wherein the state of the fluid level sensor is selected from the group consisting of a fluid state and a no fluid state;
a non-volatile memory device to indicate whether the corresponding fluid level sensor is at the fluid state or the no fluid state; and
a locking device to irreversibly set the non-volatile memory device to the no fluid state independent of a write command from a controller.

20. The system of claim 19, wherein the fluid is ink.

* * * * *